United States Patent [19]
Asselman et al.

[11] 3,967,465
[45] July 6, 1976

[54] CONTAINER FOR STORING AND TRANSPORTING A LIQUEFIED GAS

[75] Inventors: George Albert Apolonia Asselman; Harmannus Hinderikus Van Mal; Andries Mijnheer, all of Eindhoven, Netherlands

[73] Assignee: U.S. Philips Corporation, New York, N.Y.

[22] Filed: June 27, 1974

[21] Appl. No.: 483,613

[30] Foreign Application Priority Data
July 4, 1973   Netherlands .................... 7309295

[52] U.S. Cl. ...................................... 62/48; 62/54; 220/85 VR
[51] Int. Cl.² ........................................ F17C 11/00
[58] Field of Search ............. 62/48, 54; 55/88, 89; 48/197 FM, 199 FM, 191; 220/85 VS, 85 VR

[56] References Cited
UNITED STATES PATENTS

| | | | |
|---|---|---|---|
| 1,841,691 | 1/1932 | Wilson | 220/85 VR |
| 2,195,077 | 3/1940 | Brown | 62/48 X |
| 2,322,617 | 6/1943 | Dayhuff | 62/48 |
| 2,663,626 | 12/1953 | Spangler | 62/48 |
| 2,882,244 | 4/1959 | Milton | 62/48 |
| 3,007,596 | 11/1961 | Matsch | 220/9 LG |
| 3,298,185 | 1/1967 | Loudon | 62/48 |
| 3,315,479 | 4/1967 | Wiswall, Jr. et al. | 62/48 |
| 3,608,324 | 9/1971 | Singleton et al. | 62/48 |
| 3,698,200 | 10/1972 | Johnson et al. | 220/9 LG |
| 3,854,911 | 12/1974 | Walker | 220/85 VR X |

FOREIGN PATENTS OR APPLICATIONS 1,291,976   10/1972   United Kingdom .................... 62/48

*Primary Examiner*—William E. Wayner
*Assistant Examiner*—Ronald C. Capossela
*Attorney, Agent, or Firm*—Frank R. Trifari; J. David Dainow

[57] ABSTRACT

Container for storing and transporting a liquefied gas provided with an auxiliary container which contains a material by which gas produced by evaporation of the liquid is sorbed at a temperature higher than the temperature of the liquid.

7 Claims, 1 Drawing Figure

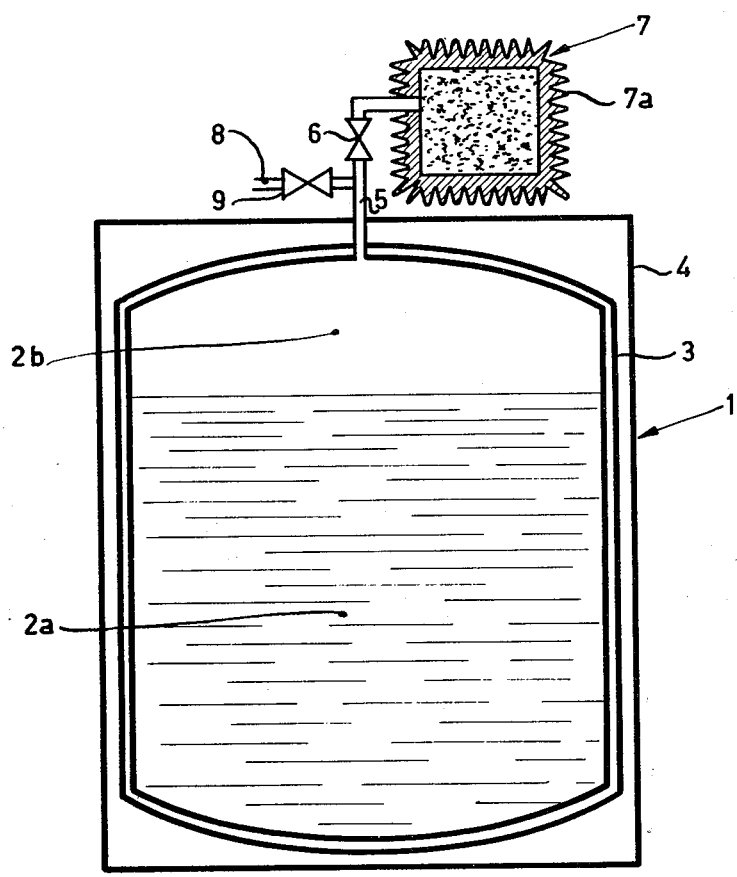

CONTAINER FOR STORING AND TRANSPORTING A LIQUEFIED GAS

BACKGROUND OF THE INVENTION

The invention relates to a container for storing and transporting a liquefied gas, which container has a liquid space and a gas space which during operation are at a lower temperature level. A container of this type is described, for example, in a book by R. B. Scott, "Cryogenic Engineering" (D. Van Nostrand Company, Inc. 1959), page 226, wherein the vapor space of a transport dewar for liquid hydrogen accommodates a cooling coil through which cooled helium flows. The cooling coil ensures, by recondensation of hydrogen which may be evaporated owing to heat leak into the liquid, that the pressure in the dewar does not exceed a given value.

Such a construction has disadvantages. The use of the helium refrigerator renders the system complicated and expensive, and the vehicle carrying the dewar must be unnecessarily large to accommodate the refrigerator also. The latter condition results in increased cost of transportation.

Owing to the stringent safety regulations which generally must be observed when transporting a liquefied gas, such as liquid hydrogen, the thermal insulation and the further construction of transport dewars, transport tanks and the like have to satisfy exacting requirements. For example, in practice the condition must be satisfied that no venting of hydrogen vapor produced by heat leak into the liquid is necessary for 110 hours after the tank has been filled (see for example the paper: "The safe distribution and handling of hydrogen for commercial application," Paper No. 729,209, seventh Intersociety Energy Conversion Engineering Conference, San Diego, September 1972). This ensures that during transport no danger of explosion due to venting (hydrogen together with the oxygen of the air may form the readily exploding oxyhydrogen) can arise. However, the use of high-quality vacuum insulation is inevitable.

It is an object of the present invention to provide a transport dewar in which the abovementioned disadvantages are avoided.

SUMMARY OF THE INVENTION

The container according to the invention is characterized in that the gas space communicates with in operation at least one auxiliary container which contains a material of higher temperature level which sorbs gas produced by evaporation of the liquid; the auxiliary container is provided with at least one heat transfer device for dissipating the sorption heat evolved. The construction is very simple, safe, cheap and compact.

Because the vaporized liquid is adsorbed, or absorbed and hence the pressure level remains within acceptable limits, the requirements to be satisfied by the insulation of the container may be less stringent and the time which elapses between the filling of the container with liquefied gas and the first venting of gas may considerably be increased. In addition, a suitable choice of the sorption material enables the vapor pressure above the liquid bath to be maintained constant so that the temperature of the bath also will be constant.

An advantageous embodiment of the container according to the invention is characterized in that the auxiliary container is located outside the container and communicates with the gas space by a small-diameter pipe. Thus the sorption heat evolved need not be transferred from the container and heat leak into the container from the auxiliary container is substantially precluded.

A further advantageous embodiment of the container according to the invention in which the liquefied gas is liquid hydrogen is characterized in that the auxiliary container contains at least one compound of the formula $AB_n$, where A is Ca or one or more of the rare earth elements optionally combined with Th and/or Zr and/or Hf, B is Ni and/or Co, optionally combined with Fe and/or Cu, and $n$ has a value between about 3 and about 8.5. In this connection, the element Y is classed with the rare earth elements.

Such compounds are known from Belgian Pat. No. 744,825 and United Kingdom Pat. No. 1,291,976. They have the very advantageous property of being capable of absorbing a large amount of hydrogen per unit weight of $AB_n$ at room temperature. Moreover the bound hydrogen may readily be desorbed subsequently so that the compounds contained in the auxiliary container can be used again.

Because the compounds perform their highly absorbing effects at room temperature, the auxiliary container may be at room temperature in operation. The heat of absorption then may readily be transferred to the ambient air by the heat transfer device in the form of a radiator. Thus additional cooling means, such as for example a closed cooling circuit in which a cooling fluid circulates, may be dispensed with.

For each of said compounds isotherms can be drawn in a graph in which the hydrogen gas pressure is plotted as the ordinate and the amount of hydrogen taken up is plotted as the abscissa (see FIG. 2 of the said Belgian Pat. No. 744,825 or the said United Kingdom Pat. No. 1,291,976). Each such isotherm has a horizontal part, which generally is referred to as a plateau, at a given pressure. At the plateau pressure it is possible by means of a small pressure variation to cause a large quantity of hydrogen gas to be taken up or given off in a reversible process.

With respect to the container under consideration, said phenomenon provides the advantage that in the case of evaporation of comparatively large amounts of liquid with a consequent increase in vapor pressure, the compound $AB_n$ will take up a large quantity of hydrogen, whereas when a comparatively small amount of liquid is vaporized with a consequent comparatively constant low vapour pressure the compound shows little tendency to absorb hydrogen. As a result, a constant pressure is produced, corresponding to a given constant temperature of the liquid hydrogen bath.

In a further advantageous embodiment of the container according to the invention, the auxiliary container contains at least one of the compounds $LaNi_x$, where $4.8 \leq x \leq 5$; $LaNi_{5-y}Cu_y$, where $0 < y < 1$; $La^*Ni_z$, where $La^*$ contains 85% by weight of La and 15% by weight of other rare earth elements and $4.8 \leq z \leq 5$.

At room temperature these compounds have the following advantageous combination of properties: a very high absorption coefficient and a low plateau pressure. This permits the use of pressures of about 1 atmosphere over the liquid hydrogen bath.

An embodiment of the invention will now be described, by way of example, with reference to the accompanying diagrammatic drawing which shows, not to scale, a longitudinal sectional view of a container for transporting liquid hydrogen.

DETAILED DESCRIPTION OF THE PREFERRED EMBODIMENT

Referring now to the drawing, a container 1 has a liquid space 2a and a vapor space 2b which are enclosed in a radiation shield 3 and a vacuum jacket 4. The vapour space 2b communicates with an auxiliary container 7 by means of a pipe 5 which includes a valve 6. A filling pipe 8 including a valve 9 is connected to the pipe 5. The liquid space 2a contains liquid hydrogen and the auxiliary container 7 is filled with $LaNi_{4.5}Cu_{0.5}$ which at room temperature has a plateau pressure of about 1 atmosphere. The walls 7a of the auxiliary container 7 are made of a thermally conductive material and provided with fins. Thus the auxiliary container 7 is a radiator.

Owing to heat leaking into the container 1 liquid hydrogen is evaporated. The resulting vapor flows through the small-diameter pipe 5 to the auxiliary container 7 where it is absorbed by the $LaNi_{4.5}Cu_{0.5}$ at a pressure of 1 atmosphere. The heat of absorption evolved is dissipated to the ambient atmosphere via the thermally conductive walls 7a of the auxiliary container 7.

During transport the thermally conductive walls 7a may be maintained at a given constant temperature, for example by regulation of the airstream flowing past or by means of a cooling fluid circuit. When the transport container has reached its destination the hydrogen can be desorbed from the $LaNi_{4.5}Cu_{0.5}$ by heating the auxiliary container 7.

What is claimed is:

1. In a storage container for storing a liquefied gas, the container including a liquid space for containing said liquefied gas, and a gas space for containing vapor of said liquefied gas, the improvement in combination therewith comprising an auxiliary container external of said storage container, duct means for communicating said vapor between said containers, a material in said auxiliary container capable of adsorbing a portion of said gas with a resulting evolution of sorption heat, heat transfer means operable with said auxiliary container for dissipating said sorption heat.

2. Apparatus according to claim 1 wherein said liquefied gas and vapor is hydrogen.

3. Apparatus according to claim 1 further comprising a radiation shield generally surrounding said storage container and a jacket generally surrounding said radiation shield for defining between said jacket and said storage container a vacuum space.

4. Apparatus according to claim 1 wherein said material in said auxiliary container comprises at least one of the compounds defined by the formula $AB_n$, where A is at least one material selected from the group consisting of Ca, the rare earth metals (each designated by R), compounds of Ca+Th, Ca+Zr, Ca+Hf, Ca+Th+Zr, Ca+Th+Hf, Ca+Zr+Hf, R+Th, R+Zr, R+Hf, R+Th+Zr, R+Th+Hf, R+Zr+Hf, and B is a material selected from the group consisting of Ni, Ni+Co, Ni+Fe, Ni+Cu, Ni+Co+Fe, Co+Cu, Ni+Co+Fe+Cu, and $n$ has a value in the range of 3 to 8.5.

5. Apparatus according to claim 1 wherein said material in said auxiliary container comprises at least one of the compounds selected from the group consisting of $LaNi_x$, where $4.8 \leq X \leq 5$; $LaNi_{5-y}Cu_y$, where $0 < y < 1$; $La^*Ni_z$, where $La^*$ contains 85% by weight of La and 15% by weight of other rare earth elements, and $4.8 \leq z \leq 5$.

6. Apparatus according to claim 1 wherein said liquefied gas has a first temperature, and said auxiliary container is operable as a second temperature higher than the first temperature.

7. Apparatus according to claim 1 wherein said liquefied gas and vapor are hydrogen and said material comprises $LaNi_{4.5}Cu_{0.5}$.

* * * * *

UNITED STATES PATENT AND TRADEMARK OFFICE
CERTIFICATE OF CORRECTION

PATENT NO. : 3,967,465
DATED : July 6, 1976
INVENTOR(S) : GEORGE ALBERT APOLONIA ASSELMAN ET AL It is certified that error appears in the above—identified patent and that said Letters Patent are hereby corrected as shown below:

Column 1, line 49 and 50, delete "in operation"

line 50, after "which" insert --in operation--

Signed and Sealed this

Fourth Day of January 1977

[SEAL]

Attest:

RUTH C. MASON
*Attesting Officer*

C. MARSHALL DANN
*Commissioner of Patents and Trademarks*